US009865148B2

(12) United States Patent
Boyd et al.

(10) Patent No.: US 9,865,148 B2
(45) Date of Patent: Jan. 9, 2018

(54) SHOPPING PARTY LOCATOR SYSTEMS AND METHODS

(71) Applicant: Wal-Mart Stores, Inc., Bentonville, AR (US)

(72) Inventors: Ruth A. Boyd, Bentonville, AR (US); Meriah D. Montondo, Rogers, AR (US); Kellie D. Embree, Bentonville, AR (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 15/494,037

(22) Filed: Apr. 21, 2017

(65) Prior Publication Data

US 2017/0316668 A1    Nov. 2, 2017

Related U.S. Application Data

(60) Provisional application No. 62/328,802, filed on Apr. 28, 2016.

(51) Int. Cl.
| *G08B 1/08* | (2006.01) |
| *G08B 21/02* | (2006.01) |
| *H04W 4/02* | (2009.01) |
| *H04W 4/08* | (2009.01) |
| *G08B 27/00* | (2006.01) |

(52) U.S. Cl.
CPC ....... *G08B 21/0205* (2013.01); *G08B 27/001* (2013.01); *H04W 4/02* (2013.01); *H04W 4/08* (2013.01)

(58) Field of Classification Search
CPC combination set(s) only.
See application file for complete search history.

(56) References Cited

U.S. PATENT DOCUMENTS

| 7,330,121 B2 | 2/2008 | Schoppmeyer |
| 7,769,207 B2 | 8/2010 | Olivo, Jr. et al. |
| 8,396,462 B2 * | 3/2013 | Park ........................ H04L 67/18 340/539.15 |

(Continued)

OTHER PUBLICATIONS

"Child Rescue Alert,", Missing People, ChildRescueAlert.org.uk, updated Sep. 16, 2015; 5 pages.

(Continued)

*Primary Examiner* — Travis Hunnings
(74) *Attorney, Agent, or Firm* — Schmeiser, Olsen & Watts LLP

(57) ABSTRACT

Provided are a shopping party locator system and method. The system and method includes creating a shopping party for a group of customers entering a store, wherein creating the shopping party includes operating a shopping party application on a store computing system to take and store a photo of the group of customers and create a label for each member of the group of customers. The label of a member of the group of customers separated from the shopping party may be scanned by a scanning device. The label of any member of the shopping party may be scanned if a member is discovered missing. The system automatically notifies a designated caretaker and notifies all associates and customers in the store that the member is separated in order to find the separated person. Once found, the separated member's label may be scanned the identity verified.

20 Claims, 4 Drawing Sheets

(56) References Cited

U.S. PATENT DOCUMENTS

| | | |
|---|---|---|
| 8,566,023 B2 | 10/2013 | Riggins et al. |
| 8,733,658 B2 | 5/2014 | Harris |
| 8,768,856 B2 | 7/2014 | Simrell |
| 2005/0086261 A1 | 4/2005 | Mammone |
| 2007/0036395 A1 | 2/2007 | Okun |
| 2012/0181332 A1* | 7/2012 | Langley ............ G08B 21/0202 235/380 |
| 2012/0264456 A1* | 10/2012 | Park ....................... H04L 67/18 455/456.3 |
| 2014/0266669 A1 | 9/2014 | Fadell et al. |

OTHER PUBLICATIONS

Hart, Johnathan "Implementing a Missing Child Procedure within a Campus Recreation Department," SportRisk.com, Apr. 10, 2011; 3 pages.

Aguinaga, Salvador and Christian Poellabauer "Method for Privacy-Protecting Display and Exchange of Emergency Information on Mobile Devices," 2012 IEEE International Conference on Collaboration Technologies and Systems (CTS), May 21-25; 4 pages.

* cited by examiner

SHOPPING PARTY LOCATOR SYSTEMS AND METHODS

CROSS REFERENCE TO RELATED APPLICATION[S]

This application claims priority to U.S. Provisional Patent Application entitled "SHOPPING PARTY LOCATOR SYSTEMS AND METHODS," Ser. No. 62/328,802, filed Apr. 28, 2016, the disclosures of which are hereby incorporated entirely herein by reference.

FIELD OF THE INVENTION

The invention relates generally to a shopping party or group, and more specifically, to systems and methods for identifying a shopping party and locating a lost member of the shopping party.

BACKGROUND

People often shop at stores, such as grocery stores, department stores and the like in groups or shopping parties. A shopping party may include a group of individuals that are associated together at a store for shopping, such as, but not limited to a family, a caregiver and dependents, and the like. While shopping, members of a shopping party can become separated. Usually the person lost does not carry a phone, which makes finding them difficult. Therefore, someone has to leave the area in which the lost person may be searching for them in order to request help from a store employee.

BRIEF SUMMARY

In one aspect, provided is a method for identifying a shopping party, comprising: creating a shopping party for a group of customers entering a store, wherein creating the shopping party includes operating a shopping party application on a store computing system to take and store a photo of the group of customers and create a label for each member of the group of customers, each label comprising a same code that is linked to the photo; providing, at the store, a label to each member of the group of customers; scanning, at the store with a store scanning device, the label of a member of the group of customers separated from the shopping party; and automatically notifying, from the store computing system, a designated caretaker for the group of customers that the separated member of the group of customers has been scanned.

In another aspect, provided is a method for identifying a shopping party, comprising: creating a shopping party for a group of customers entering a store, wherein creating the shopping party includes operating a shopping party application on a store computing system to take and store a photo of the group of customers and create a label for each member of the group of customers, each label comprising a same code that is linked to the photo; providing, at the store, a label to each member of the group of customers; scanning, at the store, the label of a designated caretaker for the group of customers in response to the caretaker determining a member of the group of customers is separated from the shopping party; automatically displaying the photo, by operating the shopping party application on the store computing system, in response to scanning the label of the designated caretaker; identifying on the displayed photo, the separated member of the group of customers of the shopping party; and sending a notification by the store computing system to employees and customers within the store, wherein the notification includes a photo of the member separated from the group of customers.

In another aspect, provided is a system for locating a member separated from a shopping party, the system comprising: a plurality of scanning devices for scanning bar codes; and a store computer system of a store computing system located at a store, which store computer system is coupled to the plurality of scanning devices and programmed to: receive from a scanning device of the plurality of scanning devices a signal comprising data associated with a scanned bar code; automatically identify a shopping party in response to processing the data from the scanning device; automatically display a photo of the shopping party on computer of the store computing system in response to identifying the shopping party, wherein a member separated from the shopping party is identifiable; using data received and stored, automatically generate and transmit to all computers of the store computing system that displays a photo of the separated member of the shopping party; receive from a scanning device of the plurality of scanning devices a signal comprising data associated with a scanned bar code of a label of the separated member from the shopping party; and automatically notify the store computing system that the separated member of the shopping party has been scanned.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Many store customers shop in groups, such as families or a caregiver with a dependent. These groups are referred to as shopping parties. At times during shopping at a retail store, member of the shopping party may become separated from the group and in particular from the caretaker of the shopping party. These separated members often do not have a form of mobile communication and it is difficult to find the separated member.

The present inventive concepts utilize a system for obtaining a photo of a shopping party upon entry to a store and providing a label having a code, such as a bar code that groups members of the shopping party together. In the event a member of the shopping party is separated from the shopping party, the bar codes may be scanned with a store scanning device or mobile device operating a mobile application. The scanning of the code on the label begins a location of the process for locating the separated member for unifying with the shopping party.

The present inventive concepts will give customers peace of mind to know that the store is concerned with their children's or dependent's safety, using all aspects of technology and social media to ensure the safe return of the missing party. The store will have the ability to notify any relevant authority or agency as well as possible witnesses by using our global centralized systems. By allowing customers to notify the store, using any device within the store, store associate or via smart application, as soon a party goes missing, the success rate of recovering the missing party increases significantly. Should the customer choose to use the Shopping Party Locator, should a party go missing and not be found in the store, the most current photo is available and ready to be distributed as necessary.

Figure 1:
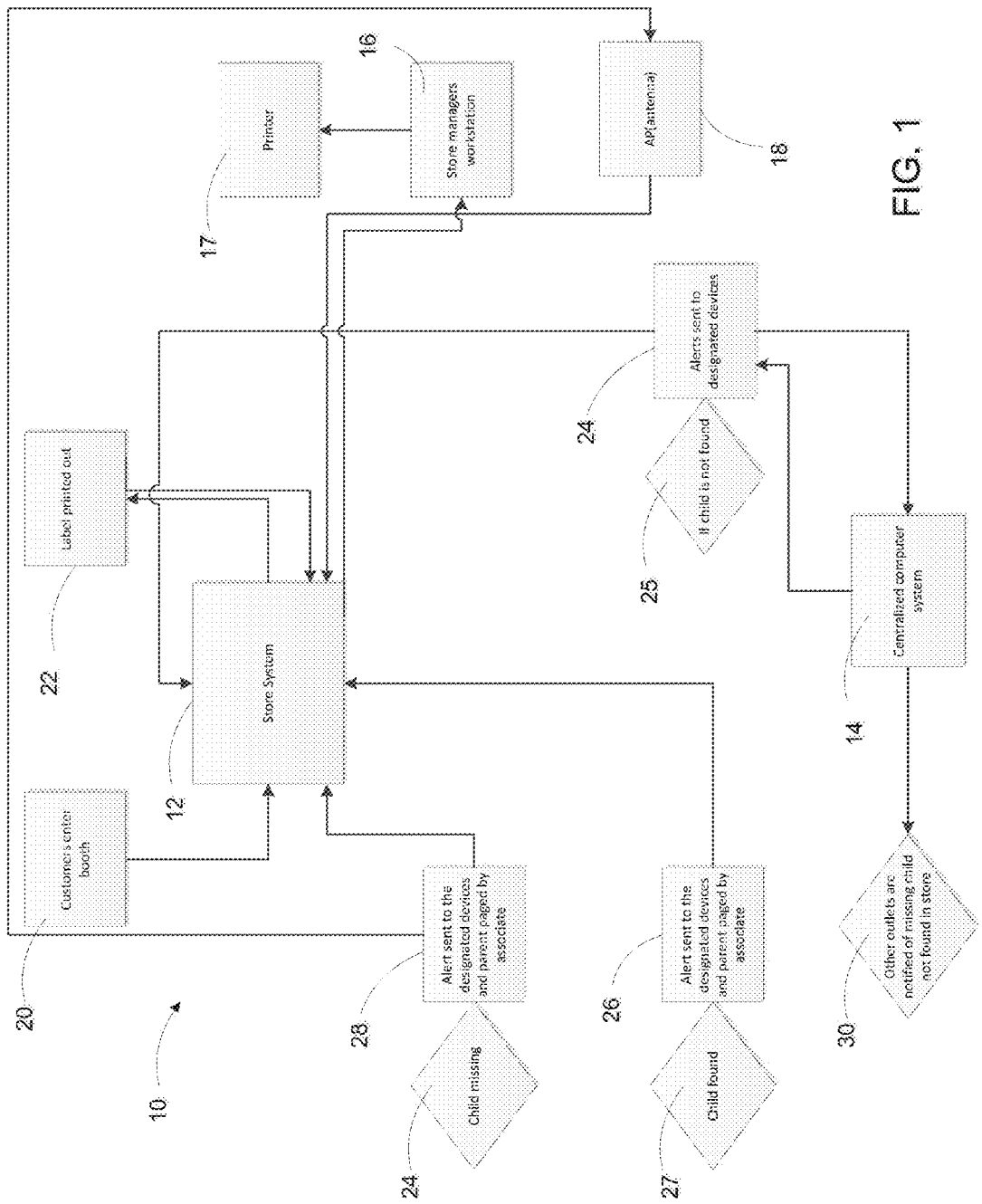
FIG. 1 is a block diagram of shopping party locator system at a retail store at which embodiments of the present inventive concepts are employed.

FIG. 1 is a block diagram of a shopping party locator system 10 in accordance with embodiments.

The shopping party locator system 10 can include a store computer system 12, a centralized computer system 14 and a store managers workstation 16. As a shopping party or group of customers enters a store, the customers are directed to a booth 20. The store computer system 12 operates to capture a photo of the group of customers and assigns a code and prints the code on a label using printer 22. A caregiver, such as a parent, guardian or the like also provides certain information, such as, but not limited to, a phone number and a name and the same would be associated with the code on the label. The code may be a bar code, or it may be other types of codes, such as a QR code and the like. The labels may be applied to the customers in the shopping party. It will be understood that the caregiver may determine which of the shopping party may be in the photo, such as children, elderly and the like. The imaging software utilized by a store computing system, including a store computer system, includes a functionality of recognizing and determining the number of faces in the photo and number each for identification purposes should it be needed.

In some embodiments, the number of faces in the photo would determine the number of labels to be printed as each person in the shopping party would need a label. In other embodiments, customers may override the number of labels to be printed, such as instances when a parent(s) is not in the photo, a small infant is being held, or the like. However, labels on infants would help in other situations, such as, but not limited to, leaving children in shopping carts and not realizing it until the parent(s)/care giver has made it home. In these instances, as soon as the child is found, the label could be scanned and parents/care giver would be notified.

Figure 2:
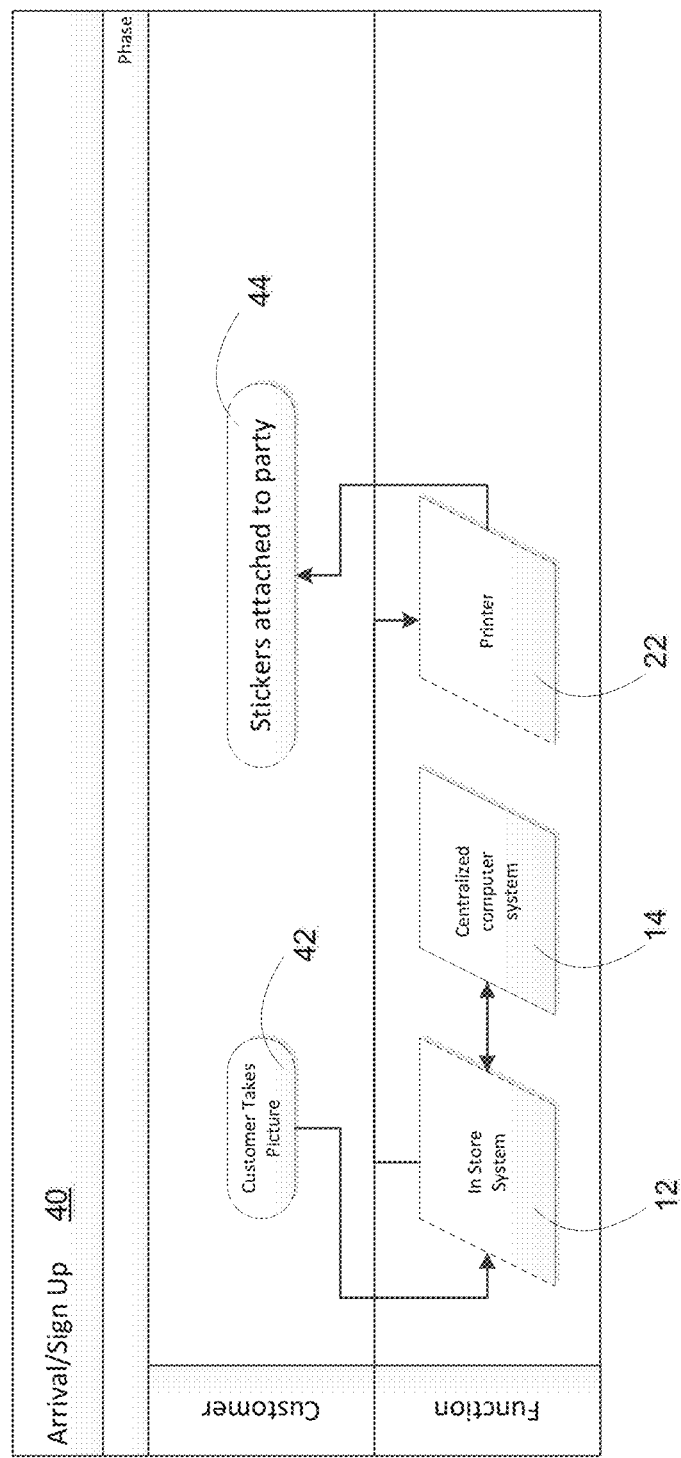
FIG. 2 is a block diagram of an arrival/sign up system of the system of FIG. 1, in accordance with some embodiments.

With further reference to the block diagram of an arrival/sign up system 40 of FIG. 2, customers may enter a designated area or booth 20. The customer picture may be taken as indicated in box 42 and the image sent to the store computer system 12 and the centralized computer system, 14 which includes a store computer system of the system 10. The image is processed and individuals identified and further shopping party information is entered into the centralized computer coupled to the store computer system 12, wherein input at the store computer system 12 transmits data to the centralized computer system 14. A label with a code associated with the photo of the shopping party and corresponding information is printed at printer 22. The labels, which may be stickers, may be attached to each member of the shopping party as indicated at box 44.

The shopping party may then begin shopping. If during shopping someone were to be separated from the shopping party, help could be requested in by scanning of a label. One way is to scan any given label within the shopping party on any store scanning device, such as, but not limited to price verifier scanner, wherein the price verifier scanner is coupled with the store computer system 12 to send data associated with the scanned code to the store computer system and to the centralized computer system 14, wherein the store computer system includes an application or is otherwise programmed to receive communication or signal including the scanned code data and coupled with the store computer system/data base in order initiate a process of locating a separated member of the shopping party. Another way is scanning any given label within the shopping party on any mobile device operating a "Shopping Party Locator" application. In these embodiments, the "Shopping Party Locator" may be programmed to recognize the store number automatically, using current back office equipment. Yet another way of scanning a label is to notify an associate or the Service Desk, wherein an employee of the store may then scan any given label within the shopping party. The register would call the POS system or current back office equipment using a coded application.

Once a member is determined missing at decision diamond 24 and a label is scanned. To identify the separated person of the shopping party, after the label code has been scanned, the photo associated with the label would automatically be sent from the store computer system to be displayed on the screen of the designated devices. Each person in the photo may be identified with a number assigned by the system 10. The customer, CSM or the like, may either touch the screen over the separated person's face, or enter the separated person's associated system number using a keypad, or otherwise indicate the photo of the separated member of the shopping party. In at least this way, the system 10 provides verification of the scanned label to ensure that an accidental scan of the label with the code has not occurred.

As soon as the label code is scanned, but prior to actual facial identification, an automatic announcement through the paging system would notify all store associates and customers of a Code Adam. This is beneficial as the store can go into Code Adam mode while awaiting verification and /or the photo. The parents/care giver may be so distraught that they are not thinking clearly and may have difficulty getting through the rest of the identification process. This would ensure the search begins as soon as possible.

Once the separated person has been identified or verified through the system 10, the system will automatically send an alert, as designated in box 28, including the photo, noting the separated person by number, to all designated devices, including but not limited to, all registers and thin clients, and mobile devices operating the "Shopping Party Locator" application and associated with the same store number as the scanned label. All associates within the store would have access to the photo on their store devices. The face of the separated person would be available to anyone using the "Shopping Party Locator" application on their mobile devices within the given store. This would allow customers to help with the search also. In some embodiments, an alert much like a weather alert would be sent to the smartphone. If the customer wanted to participate in looking for the missing person, they could follow a link, which would bring up the photo.

If the separated member of the shopping party is found at decision diamond 27, an alert is sent to the designated devices and a care giver is paged at block 26. Verification of the separated person and association with a particular shopping party is performed. When the separated person is found and verified, a CSM or manager will cancel the Code Adam.

If a shopper finds the missing person, they would have the ability to push the "found" button and it would automatically notify the AP system and back office to give the location. It would send an alert to the CSM, assistant manager and store manager to prevent the customer from wandering around the store with the separated person. However, it will not cancel the alert until the missing person is verified and reunited with his or her shopping party.

Should the authorities be needed, the photo would be the most recent taken showing clothing, hair style, hair color, height, etc. It could be shared through social media, news agencies, police, etc.

If a separated member is not found at decision diamond 25, an alert is sent to designated devices at block 24. At predetermined times; the system 10 will follow a designated escalation path automatically until the separated person is located. This escalation patch includes: a) once a person has been reported missing and the label scanned, the system will automatically send the Code Adam; b) after a predetermined time (based on current store procedure) the system will automatically send the missing person alert to local media, local police, other stores within a given radius, social media, state police as depicted in decision diamond 30; c) the system will automatically send the photo to the store manager's workstation 16 to be printed on the store manager's network printer 17 so it can be printed out and placed on the "missing" wall in the store; and d) alerts will continue at predetermined times until a member of management cancels the alert. This can be done from any store or police station should the missing person be found there.

When the missing person is found, a CSM or manager will cancel the Code Adam. Further, photos are purged, in-store, on a rolling 24 hour period. Further still, photos of children that are not immediately found will be kept and uploaded to the Home Office and can be played on any in-store "missing child TV," wherein instead of keeping paper photos lined up on a wall near Customer Service or Store Pickup, a TV may be displayed near the registers that continuously scrolls through photos of missing children.

Figure 3:
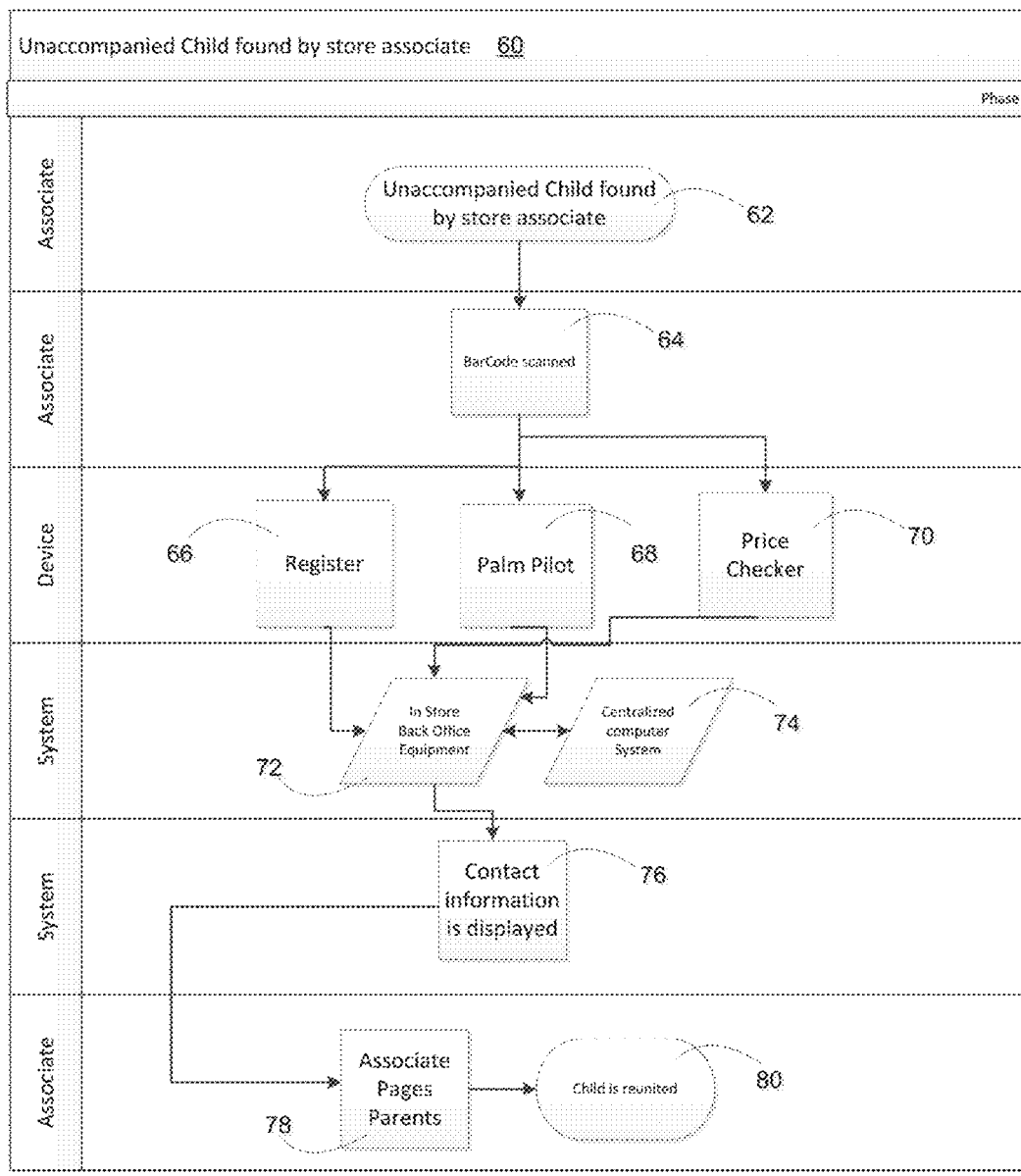
FIG. 3 is a flow diagram illustrating a method for locating a separated member of a shopping party by a store associate, in accordance with some embodiments.

Referring again to the drawings, FIG. 3 depicts a method 60 of using the system when a separated member is found by a store associate, according to embodiments. The method 60 may begin at Step 62 when a separated member is found by a store associate. The store associate may then scan the code on the label at Step 64 with a designated device, including, but not limited to a register 66, a mobile device 68, a price checker 70, and the like. The instore system equipment 72 receives the data and forward to the centralized computer system 74, wherein the centralized computer system 74 is programmed to automatically send an alert throught the store back office equipment 72 to designated devices at Step 76. The method may further include paging the parent/care giver at Step 78 to notify the parent/care giver that the separated person is found. The method 60 may then include reuniting the separate member with his or her shopping party at step 80.

Figure 4:
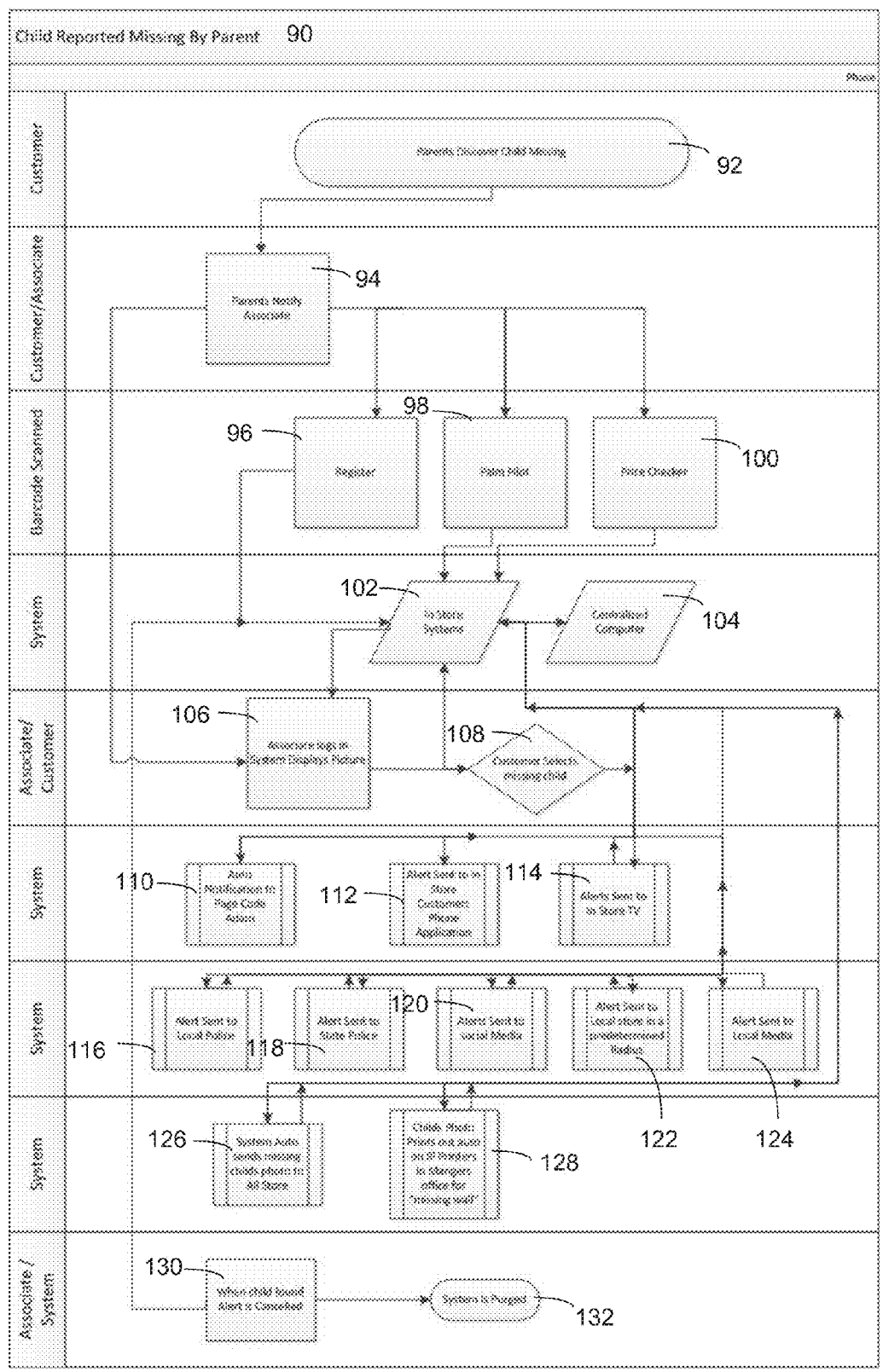
FIG. 4 is a flow diagram illustrating a method for locating a separated member of a shopping party by a parent, in accordance with some embodiments.

FIG. 4 depicts a method 90 of using the shopping party locater system when a parent/care giver reports a missing or separated member from the party, according to embodiments. The method 90 may be initiated by a parent/care giver discovering that a member of the shopping party is missing (Step 92). The parent/care giver may notify an associate (Step 94) and a bar code scanned with a designated device, including, but not limited to a register 96, a mobile device 98, a price checker 100 and the like. The data is sent to the store computer system 102 and the centralized computer system 104. The centralized computer system with the store computer system, operate to automatically issue a Code Adam at Step 110, send an alert to designated devices, including store devices and in store customers operating a "Shopping Party Locator" application on a mobile device and is associated with the particular store at Step 112; and send alert to the in store TV's for displaying a photo of the separated member of the shopping party. If after a predetermined time has passed and the separated member has not been located, the method 90 may include sending an alert to third parties, including local police (Step 116), state police (Step 118), social media (Step 120), local stores in a predetermined radius (Step 122), local media (Step 124), and the like. The method 90 may include automatically sending from the system missing person photo to all stores (Step 126), and print out photo at a printer of the manager for display on the "missing wall" of the store (Step 128). When the child is found, the alert is cancelled (Step 130) and the system is purged (Step 132).

According to other embodiments, a method for identifying a shopping party includes creating a shopping party for a group of customers entering a store, wherein creating the shopping party includes operating a shopping party application on a store computing system to take and store a photo of the group of customers and create a label for each member of the group of customers, each label comprising a same code that is linked to the photo; providing, at the store, a label to each member of the group of customers; scanning, at the store with a store scanning device, the label of a member of the group of customers separated from the shopping party; and automatically notifying, from the store computing system, a designated caretaker for the group of customers that the separated member of the group of customers has been scanned.

The method may include scanning the label further comprises scanning, at the store, the label with a mobile device operating a mobile locator application. The code may be a bar code. In the method, notifying the designated caretaker comprises sending an electronic notification to a mobile device operating a mobile locator application. Further, notifying the designated caretaker comprises providing an audible notification through a sound system of the store. The method may further include issuing a Code Adam alert throughout the store in response to scanning the label. The method includes sending, by the store computing system, a notification to employees and customers within the store, wherein the notification includes a photo of the member separated from the group of customers.

If the child is not found, the method may also include sending, by the store computing system, the photo of the separated member of the group to third parties comprising social media, news agencies and police in response to not locating the separated member of the group of customers. The method also includes purging photos stored on the store computing system on a rolling 24 hour period.

In another embodiment, a method for identifying a shopping party includes: creating a shopping party for a group of customers entering a store, wherein creating the shopping party includes operating a shopping party application on a store computing system to take and store a photo of the group of customers and create a label for each member of the group of customers, each label comprising a same code that is linked to the photo; providing, at the store, a label to each member of the group of customers; scanning, at the store, the label of a designated caretaker for the group of customers in response to the caretaker determining a member of the group of customers is separated from the shopping party; automatically displaying the photo, by operating the shopping party application on the store computing system, in response to scanning the label of the designated caretaker; identifying on the displayed photo, the separated member of the group of customers of the shopping party; and sending a notification by the store computing system to employees and customers within the store, wherein the notification includes a photo of the member separated from the group of customers.

In the method, scanning the label further comprises scanning the label with any scanning device within the store or scanning, at the store, the label with a mobile device operating a mobile locator application. The code may be a bar code.

The method may further comprise issuing a Code Adam alert throughout the store in response to scanning the label. The method may also include sending, by the store computing system, the photo of the separated member of the group to third parties comprising social media, news agencies and police in response to not locating the separated member of the group of customers. The method includes purging photos stored on the store computing system on a rolling 24 hour period.

Another embodiment includes a system for locating a member separated from a shopping party. The system comprises a plurality of scanning devices for scanning bar codes; and a store computing system located at a store. The store computer system is coupled to the plurality of scanning devices and programmed to: receive from a scanning device of the plurality of scanning devices a signal comprising data associated with a scanned bar code; automatically identify a shopping party in response to processing the data from the scanning device; automatically display a photo of the shopping party on computer of the store computing system in response to identifying the shopping party, wherein a member separated from the shopping party is identifiable; using data received and stored, automatically generate and transmit to all computers of the store computing system that displays a photo of the separated member of the shopping party; receive from a scanning device of the plurality of scanning devices a signal comprising data associated with a scanned bar code of a label of the separated member from the shopping party; and automatically notify the store computing system that the separated member of the shopping party has been scanned.

The plurality of scanning devices comprises at least one mobile device operating a mobile locator application. Additionally, the plurality of scanning devices comprises at least one store scanning device. The store computing system may comprise a mobile device operating a mobile locator application.

The store computer system is further programmed to automatically issue a Code Adam alert throughout the store; automatically send the photo of the separated member of the group to third parties comprising social media, news agencies and police in response to not locating the separated member of the group of customers; and purge photos stored on the store computing system on a rolling 24 hour period.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. A system for locating a member separated from a shopping party, the system comprising:
   a plurality of scanning devices for scanning bar codes; and
   a store computer system of a store computing system located at a store, which store computer system is coupled to the plurality of scanning devices and programmed to:
   i. receive from a scanning device of the plurality of scanning devices a signal comprising data associated with a scanned bar code;
   ii. automatically identify a shopping party in response to processing the data from the scanning device;
   iii. automatically display a photo of the shopping party on computer of the store computing system in response to identifying the shopping party, wherein a member separated from the shopping party is identifiable;
   iv. using data received and stored, automatically generate and transmit to all computers of the store computing system that displays a photo of the separated member of the shopping party;
   v. receive from a scanning device of the plurality of scanning devices a signal comprising data associated with a scanned bar code of a label of the separated member from the shopping party; and
   vi. automatically notify the store computing system that the separated member of the shopping party has been scanned.

2. The system of claim 1, wherein the plurality of scanning devices comprises at least one mobile device operating a mobile locator application.

3. The system of claim 1, wherein the plurality of scanning devices comprises at least one store scanning device.

4. The system of claim 1, wherein the store computing system comprises a mobile device operating a mobile locator application.

5. The system of claim 1, wherein the store computer system is further programmed to automatically issue a Code Adam alert throughout the store.

6. The system of claim 1, wherein the store computer system is further programmed to automatically send the photo of the separated member of the group to third parties comprising social media, news agencies and police in response to not locating the separated member of the group of customers.

7. The system of claim 1, wherein the store computer system is further programmed to purge photos stored on the store computing system on a rolling 24 hour period.

8. A method for identifying a shopping party, comprising:
   creating a shopping party for a group of customers entering a store, wherein creating the shopping party includes operating a shopping party application on a store computing system to take and store a photo of the group of customers and create a label for each member of the group of customers, each label comprising a same code that is linked to the photo;
   providing, at the store, the label to each member of the group of customers;
   scanning, at the store with a store scanning device, the label of a member of the group of customers separated from the shopping party; and
   automatically notifying, from the store computing system, a designated caretaker for the group of customers that the separated member of the group of customers has been scanned.

9. The method of claim 8, wherein scanning the label further comprises scanning, at the store, the label with a mobile device operating a mobile locator application.

10. The method of claim 8, wherein the code is a bar code.

11. The method of claim 8, wherein notifying the designated caretaker comprises sending an electronic notification to a mobile device operating a mobile locator application.

12. The method of claim 8, further comprising issuing a Code Adam alert throughout the store in response to scanning the label.

13. The method of claim 8, further comprising sending, by the store computing system, a notification to employees and customers within the store, wherein the notification includes a photo of the member separated from the group of customers.

14. The method of claim 8, further comprising sending, by the store computing system, the photo of the separated member of the group to third parties comprising social media, news agencies and police in response to not locating the separated member of the group of customers.

15. A method for identifying a shopping party, comprising:
creating a shopping party for a group of customers entering a store, wherein creating the shopping party includes operating a shopping party application on a store computing system to take and store a photo of the group of customers and create a label for each member of the group of customers, each label comprising a same code that is linked to the photo;
providing, at the store, a label to each member of the group of customers;
scanning, at the store, the label of a designated caretaker for the group of customers in response to the caretaker determining a member of the group of customers is separated from the shopping party;
automatically displaying the photo, by operating the shopping party application on the store computing system, in response to scanning the label of the designated caretaker;
identifying on the displayed photo, the separated member of the group of customers of the shopping party; and
sending a notification by the store computing system to employees and customers within the store, wherein the notification includes a photo of the member separated from the group of customers.

16. The method of claim 15, wherein scanning the label further comprises scanning the label with any scanning device within the store.

17. The method of claim 15, wherein scanning the label further comprises scanning, at the store, the label with a mobile device operating a mobile locator application.

18. The method of claim 15, wherein the code is a bar code.

19. The method of claim 15, further comprising issuing a Code Adam alert throughout the store in response to scanning the label.

20. The method of claim 15, further comprising sending, by the store computing system, the photo of the separated member of the group to third parties comprising social media, news agencies and police in response to not locating the separated member of the group of customers.

* * * * *